(12) United States Patent
Hu et al.

(10) Patent No.: US 6,779,353 B2
(45) Date of Patent: Aug. 24, 2004

(54) SEALED SYSTEM MULTIPLE SPEED COMPRESSOR AND FAN CONTROL

(75) Inventors: Ziqiang Hu, Prospect, KY (US); Richard Dana Brooke, Louisville, KY (US); Alexander Pinkus Rafalovich, Louisville, KY (US); Anil Kumar Tummala, Louisville, KY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 10/113,899

(22) Filed: Mar. 29, 2002

(65) Prior Publication Data

US 2003/0182957 A1 Oct. 2, 2003

(51) Int. Cl.[7] .............................. F25B 1/00; F25D 17/00
(52) U.S. Cl. ........................... 62/180; 62/187; 62/228.4
(58) Field of Search ............................... 62/228.4, 229, 62/180, 181, 187

(56) References Cited

U.S. PATENT DOCUMENTS

| | | | |
|---|---|---|---|
| 5,231,847 A | 8/1993 | Cur et al. | |
| 5,255,530 A | * 10/1993 | Janke | ........................... 62/180 |
| 5,548,969 A | 8/1996 | Lee | |
| 5,711,159 A | 1/1998 | Whipple, III | |
| 5,996,361 A | * 12/1999 | Besler et al. | .................. 62/163 |
| 6,101,826 A | * 8/2000 | Bessler | ........................ 62/187 |
| 6,109,048 A | 8/2000 | Kim | |
| 6,216,478 B1 | 4/2001 | Kang | |

* cited by examiner

Primary Examiner—Marc Norman
(74) Attorney, Agent, or Firm—H. Neil Houser, Esq.; Armstrong Teasdale LLP

(57) ABSTRACT

An apparatus and method for controlling a sealed system including a variable speed compressor coupled to a controller is described. The method includes establishing a control grid having at least one axis corresponding to a temperature at a specified location, and the axis is divided into a plurality of operating states of the sealed system. Each of the states correspond to a sensed temperature condition at the specified location, and each of the states includes a designated compressor speed parameter. The compressor speed parameter in some of the states is different from the compressor speed parameter in other of the states.

18 Claims, 9 Drawing Sheets

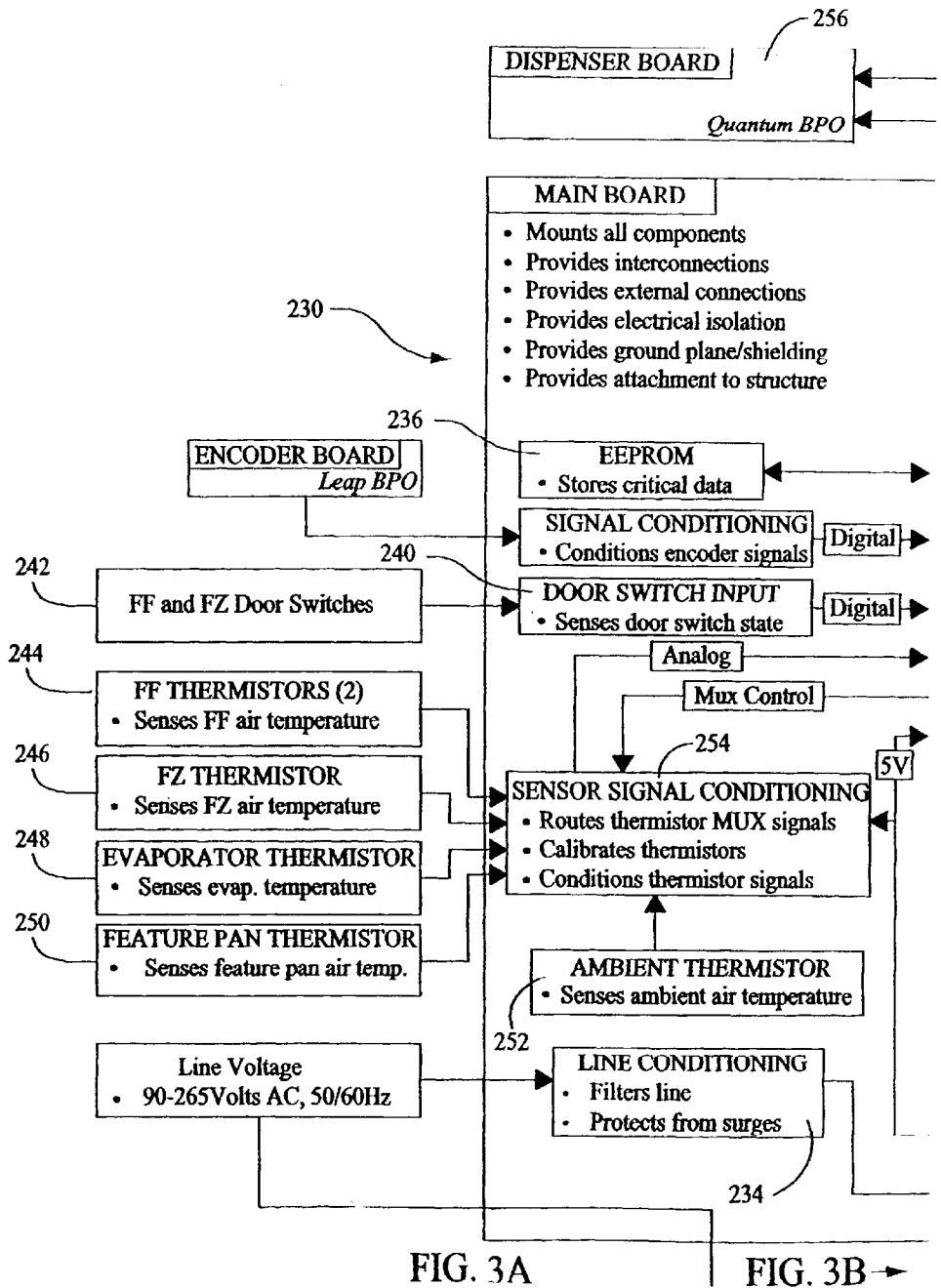
FIG. 3A | FIG. 3B →

FIG. 5

SEALED SYSTEM MULTIPLE SPEED COMPRESSOR AND FAN CONTROL

BACKGROUND OF THE INVENTION

This invention relates generally to sealed system refrigeration devices, and more particularly, to control systems for refrigerators.

Modern refrigerators typically include a compressor, an evaporator, and a condenser in a closed refrigeration circuit, and a number of fans that facilitate the refrigeration circuit and direct cooled air into refrigeration compartments. Conventionally, the compressor, evaporator and condenser are operated at a single speed, and a plurality of single speed fans are employed in association with the condenser, evaporator, condenser and also to direct cooled air throughout the refrigerator. Collectively, these components are sometimes referred to as a sealed system. While these single speed sealed systems have been satisfactory in the past, they are now perceived as disadvantageous in several aspects.

For example, such single speed systems often entail considerable temperature variation in operation of the refrigerator as the sealed system cycles on an off. Further, the refrigerator can sometimes be undesirably noisy as it cycles from an off or relatively silent condition to an on condition with the sealed system components energized. In addition, single speed systems are not as energy efficient as desired.

While most of these disadvantages can be addressed by using multiple speed or variable speed fans and sealed system components, use of variable speed components complicates the refrigeration controls considerably. A number of operating states corresponding to different combinations of the components at various speeds is virtually infinite, and finding and maintaining an optimal refrigerator state in an energy efficient manner can be formidable task. Additionally, manipulating component speeds in an energy efficient manner while responding to changing operating conditions and environments, such as door open events and ambient temperature fluctuation, is a challenge.

BRIEF DESCRIPTION OF THE INVENTION

In one aspect, a method for controlling a sealed system including a variable speed compressor coupled to a controller is provided. The method comprises establishing a control grid having at least one axis corresponding to a temperature at a specified location, and the axis is divided into a plurality of operating states of the sealed system. Each of the states correspond to a sensed temperature condition at the specified location, and each of the states includes a designated compressor speed parameter. The compressor speed parameter in some of the states is different from the compressor speed parameter in other of the states.

In another aspect, a method for controlling a sealed system is provided. A controller is operatively coupled to a compressor operable at a multiplicity of speeds, a condenser fan operable at a multiplicity of speeds, and an evaporator fan operable at a multiplicity of speeds, and the controller is further coupled to at least a first thermistor in a first location. The method comprises sensing a temperature at the first location with the at least one thermistor, selecting optimum control parameters for the compressor, condenser fan and evaporator fan from one of a plurality of states corresponding to the sensed temperature in a control grid, and operating the compressor, condenser fan, and evaporator fan according to the control parameters.

In another aspect, a method for controlling a refrigeration system is provided. The refrigeration system includes a fresh food compartment and a freezer compartment with a damper establishing flow communication therebetween, and a sealed system for forcing cold air through the refrigerator compartments. The sealed system includes a compressor, a condenser fan, an evaporator fan and a fresh food compartment fan. The refrigerator further includes a controller operatively coupled to the compressor, the condenser fan, the damper, the evaporator fan and the fresh food fan. The method comprises reading data corresponding to a fresh food compartment condition, reading data corresponding to a freezer compartment condition, determining a state of the refrigeration system in a two-dimensional logic control grid based upon the fresh food compartment and the freezer compartment data, and executing an optimal control algorithm for the determined state of the refrigeration system. The optimal control algorithm includes one of a plurality of compressor speeds corresponding to the determined state.

In another aspect, a refrigeration device is provided. The refrigeration device comprises a compressor operable in a multiplicity of speeds, a controller operatively coupled to said compressor, and a thermistor coupled to said controller, said controller configured to adjust a speed of said compressor in response to a signal from said thermistor and a compressor speed parameter selected from a control grid containing a plurality of states of the refrigeration device.

In another aspect, a control system for a refrigeration system is provided. The refrigeration system includes a fresh food compartment and a freezer compartment with a damper establishing flow communication therebetween. A sealed system forces cold air through the refrigerator compartments, and the sealed system includes a compressor, a condenser, an evaporator fan and a fresh food compartment fan. The control system comprises a controller operatively coupled to the damper, the compressor, the condenser fan, the evaporator fan and the fresh food fan. The controller is configured to determine an applicable state of the refrigeration system in a two-dimensional logic control grid, execute an optimal control algorithm for the determined state of the refrigeration system, and adjust control parameters as the determined state changes over time, at least one of the parameters corresponding to a compressor speed.

In another aspect, a refrigerator is provided. The refrigerator comprises a cabinet, a first refrigeration compartment within said cabinet, a second refrigeration compartment within said cabinet, a damper establishing flow communication between said first and second refrigeration compartment, and a sealed system for forcing cold air through said first and second refrigerator compartments. The sealed system comprises a compressor, a condenser fan, an evaporator fan and a fresh food compartment fan and a controller is operatively coupled to said damper, said compressor, said condenser fan, said evaporator fan and said fresh food fan. The controller is configured to determine an applicable state of the refrigeration system in a two-dimensional logic control grid corresponding to temperature conditions of said first refrigeration compartment and said second refrigeration compartment, and adjust control parameters for said sealed system as said determined state changes over time, at least one of the parameters corresponding to a compressor speed value.

BRIEF DESCRIPTION OF THE DRAWINGS

FIG. 3A is a first portion of a block diagram of the main control board shown in FIG. 2.

FIG. 5 is an exemplary logic control grid executable by the controller shown in FIGS. 2–4.

DETAILED DESCRIPTION OF THE INVENTION

Figure 1:
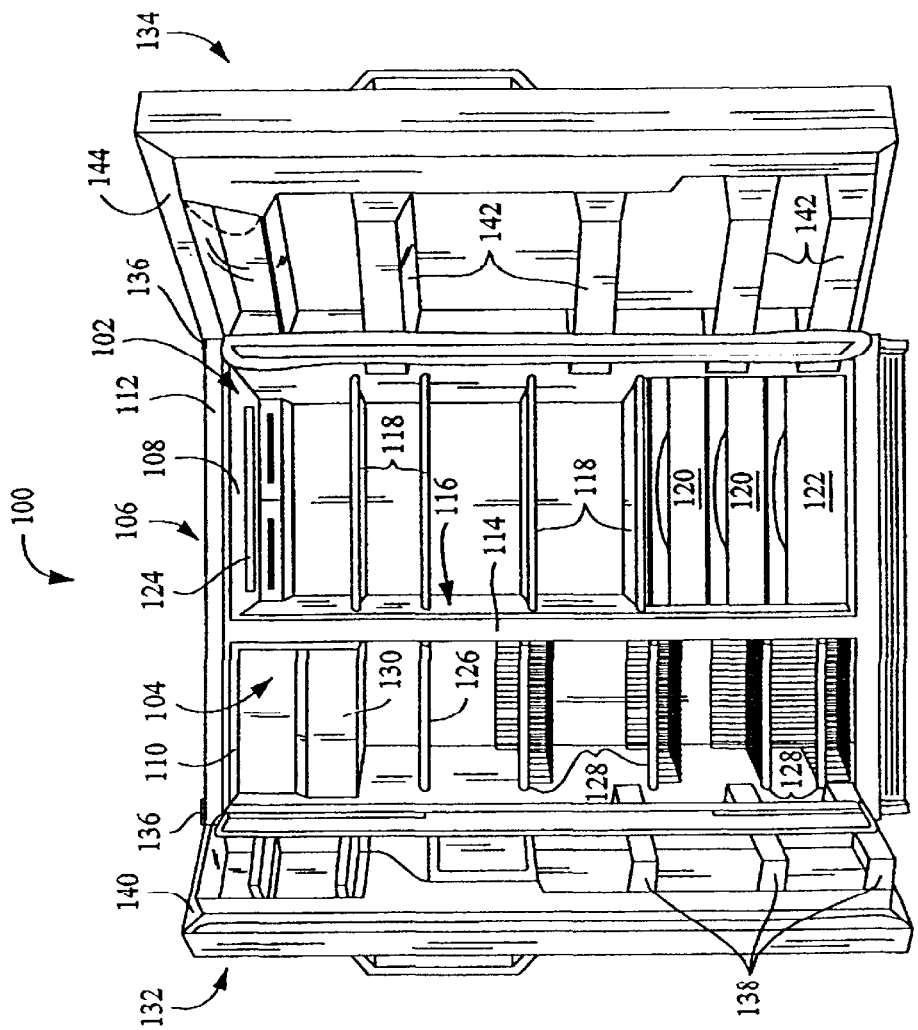
FIG. 1 is a perspective view of an exemplary refrigerator.

FIG. 1 illustrates a side-by-side refrigerator 100 in which the present invention may be practiced. It is recognized, however, that the benefits of the present invention apply to other types of appliances including single or multiple compartment refrigerators, single or multiple compartment freezers, combination refrigerator and freezers (including top mount systems), and other refrigeration devices, including but not limited to climate control systems, water coolers, wine coolers, ice makers, and vending machines having similar control issues and considerations. Consequently, the description set forth herein is for illustrative purposes only and is not intended to limit the invention in any aspect.

Refrigerator 100 includes a fresh food storage compartment 102 and a freezer storage compartment 104. Freezer compartment 104 and fresh food compartment 102 are arranged side-by-side in an outer case 106 with inner liners 108 and 110. A space between case 106 and liners 108 and 110, and between liners 108 and 110, is filled with foamed-in-place insulation or other known insulation material applied according to known techniques. Outer case 106 normally is formed by folding a sheet of a suitable material, such as pre-painted steel, into an inverted U-shape to form top and side walls of case. A bottom wall of case 106 normally is formed separately and attached to the case side walls and to a bottom frame that provides support for refrigerator 100.

Inner liners 108 and 110 are molded from a suitable plastic material to form freezer compartment 104 and fresh food compartment 102, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-styrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing a unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments 102, 104, and a spaced wall of liners 108, 110 separating compartments 102, 104 sometimes are collectively referred to herein as a center mullion wall 116.

Shelves 118 and slide-out drawers 120 normally are provided in fresh food compartment 102 to support items being stored therein. A bottom drawer or pan 122 partly forms a quick chill and thaw system (not shown) and selectively controlled, together with other refrigerator features, by a microprocessor (not shown in FIG. 1) according to user preference via manipulation of a control interface 124 mounted in an upper region of fresh food storage compartment 102 and coupled to the microprocessor. A shelf 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

In accordance with known refrigerators, refrigerator 100 also includes a machinery compartment (not shown) that at least partially contains components for executing a known vapor compression cycle for cooling air inside fresh food compartment 102 and freezer compartment 104 by transferring heat from the inside of refrigerator 100 and rejecting the heat to the outside of refrigerator 100. The components include a compressor (not shown in FIG. 1), a condenser (not shown in FIG. 1), an expansion device (not shown in FIG. 1), and an evaporator (not shown in FIG. 1) connected in series and charged with a refrigerant. The evaporator is a type of heat exchanger which transfers heat from air passing over the evaporator to a refrigerant flowing through the evaporator, thereby causing the refrigerant to vaporize and cool the evaporator surface, while heat is rejected in the condenser. The cooled air is used to refrigerate one or more refrigerator or freezer compartments via fans (not shown in FIG. 1). Collectively, the vapor compression cycle components in a refrigeration circuit, associated fans (e.g. an evaporator fan and a condenser fan), and associated compartments are referred to herein as a sealed system. The construction of the sealed system is well known and therefore not described in detail herein, and the sealed system components are operable at varying speeds to force cold air through the refrigerator subject to the following control scheme.

Figure 2:
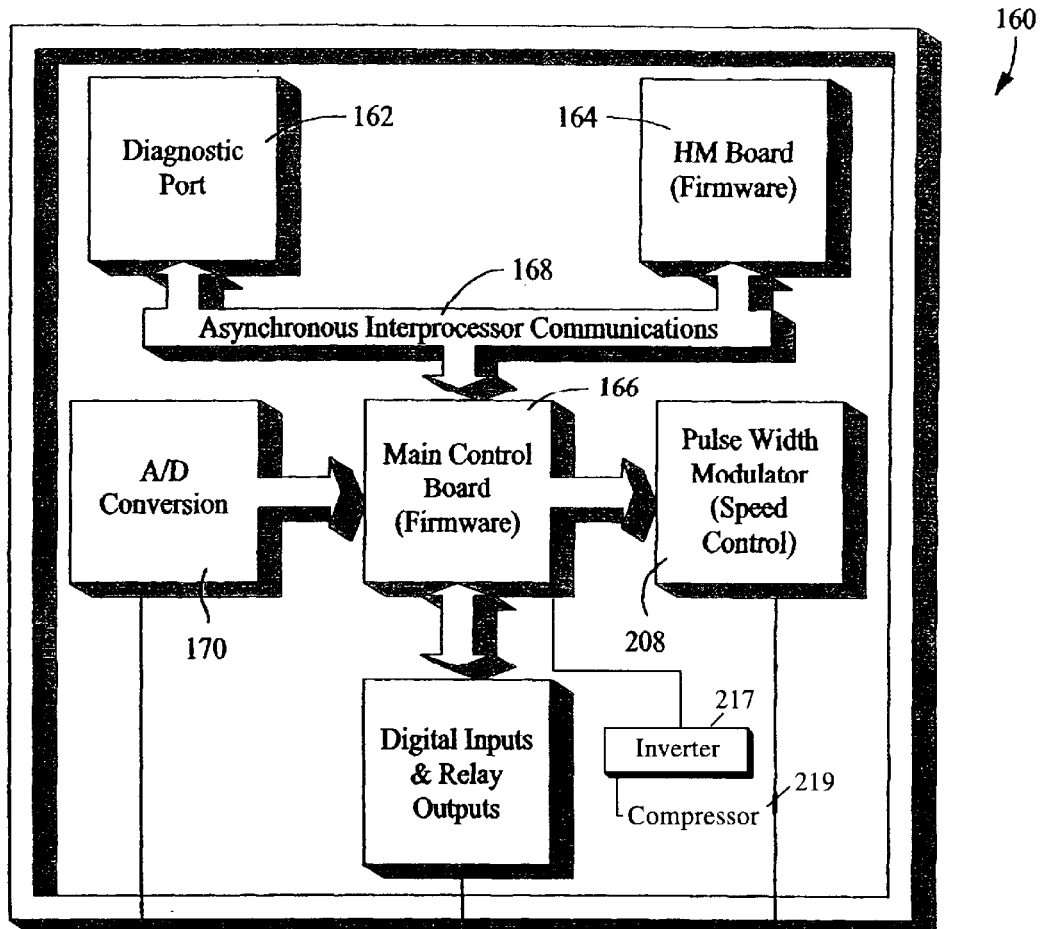
FIG. 2 is a block diagram of a refrigerator controller in accordance with one embodiment of the present invention.
Figure 3B:
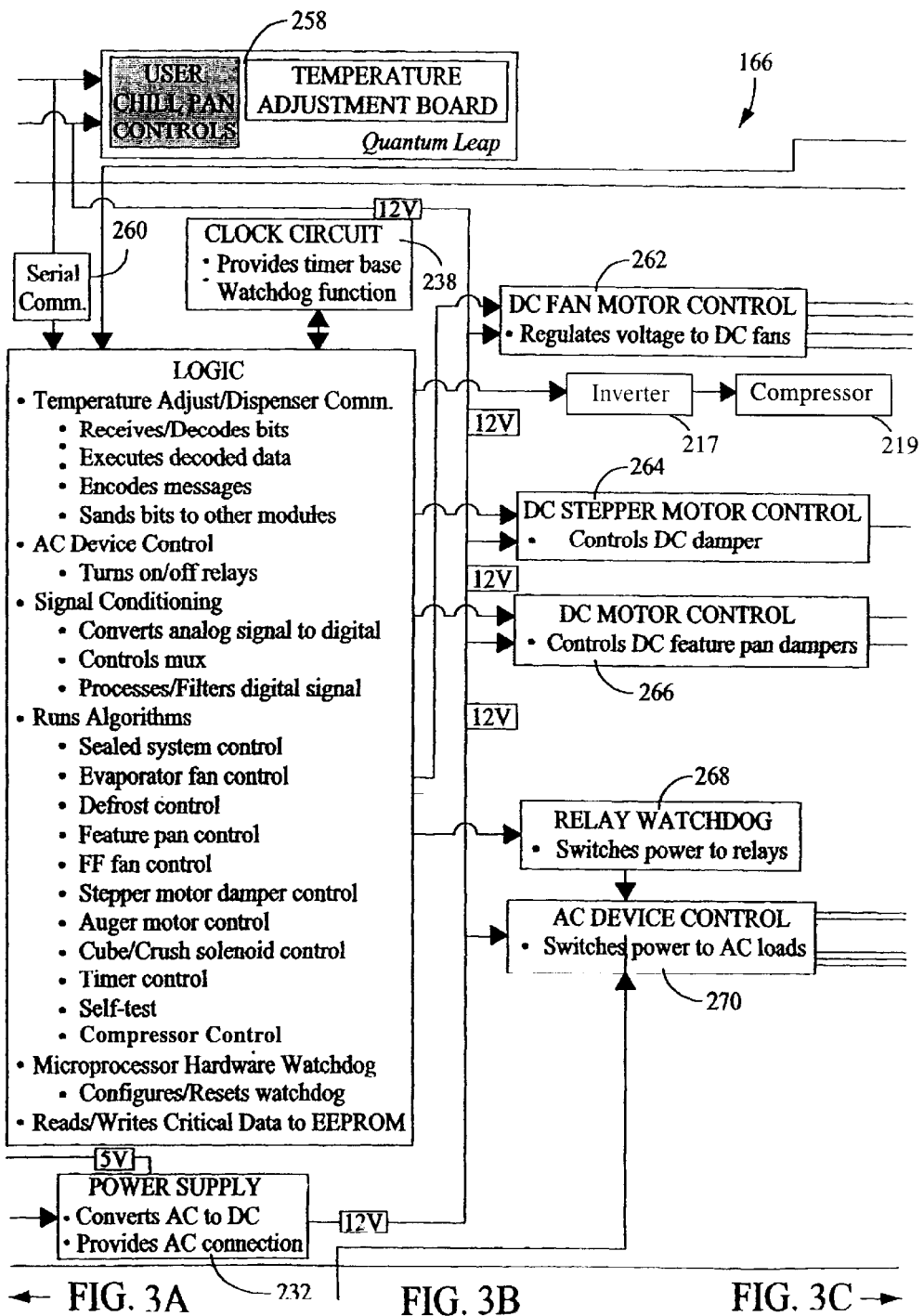
FIG. 3B is a second portion of a block diagram of the main control board shown in FIG. 2.
Figures 3B, 3C:
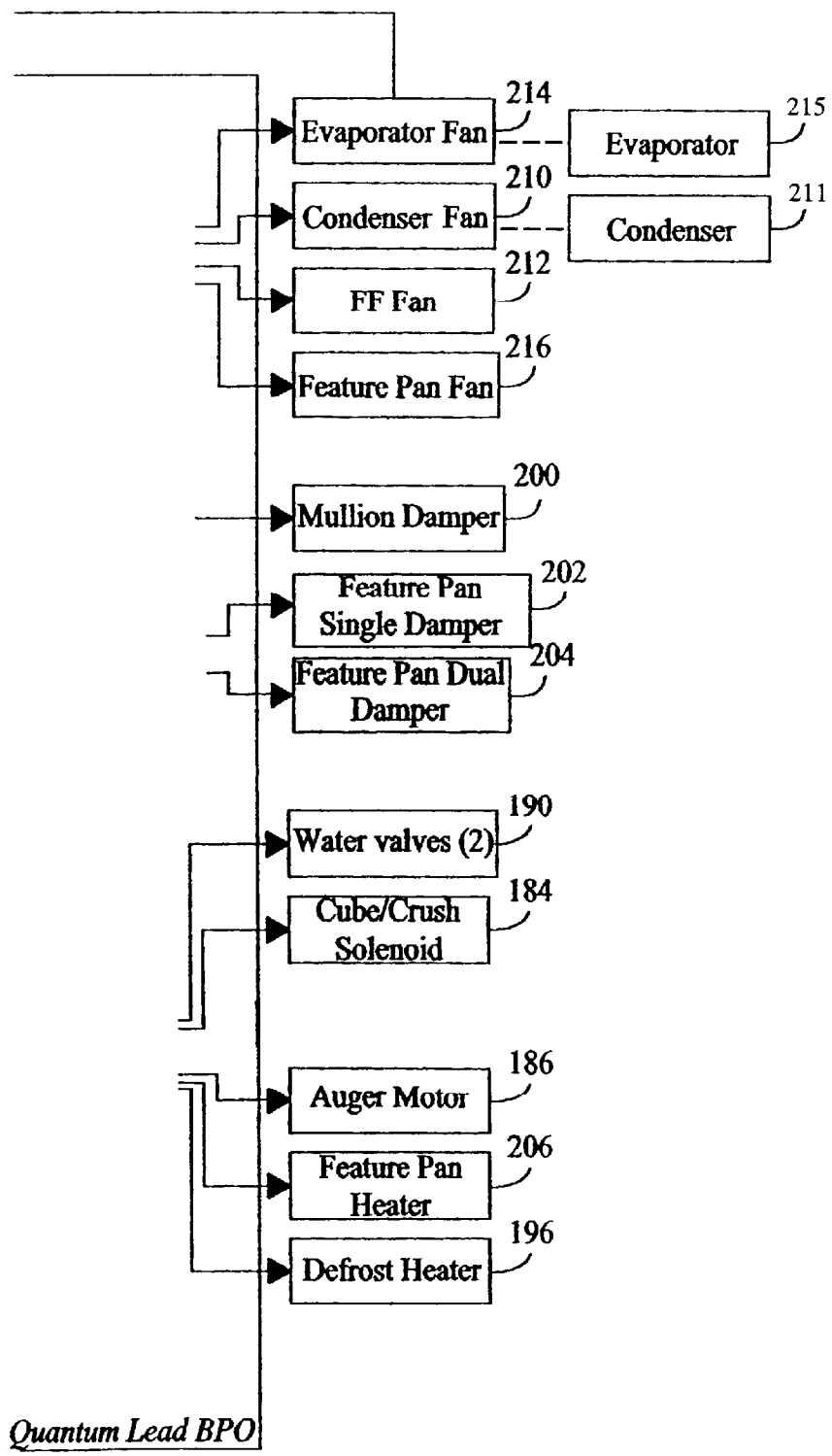
FIG. 3C is a third portion of a block diagram of the main control board shown in FIG. 2.
Figure 4:
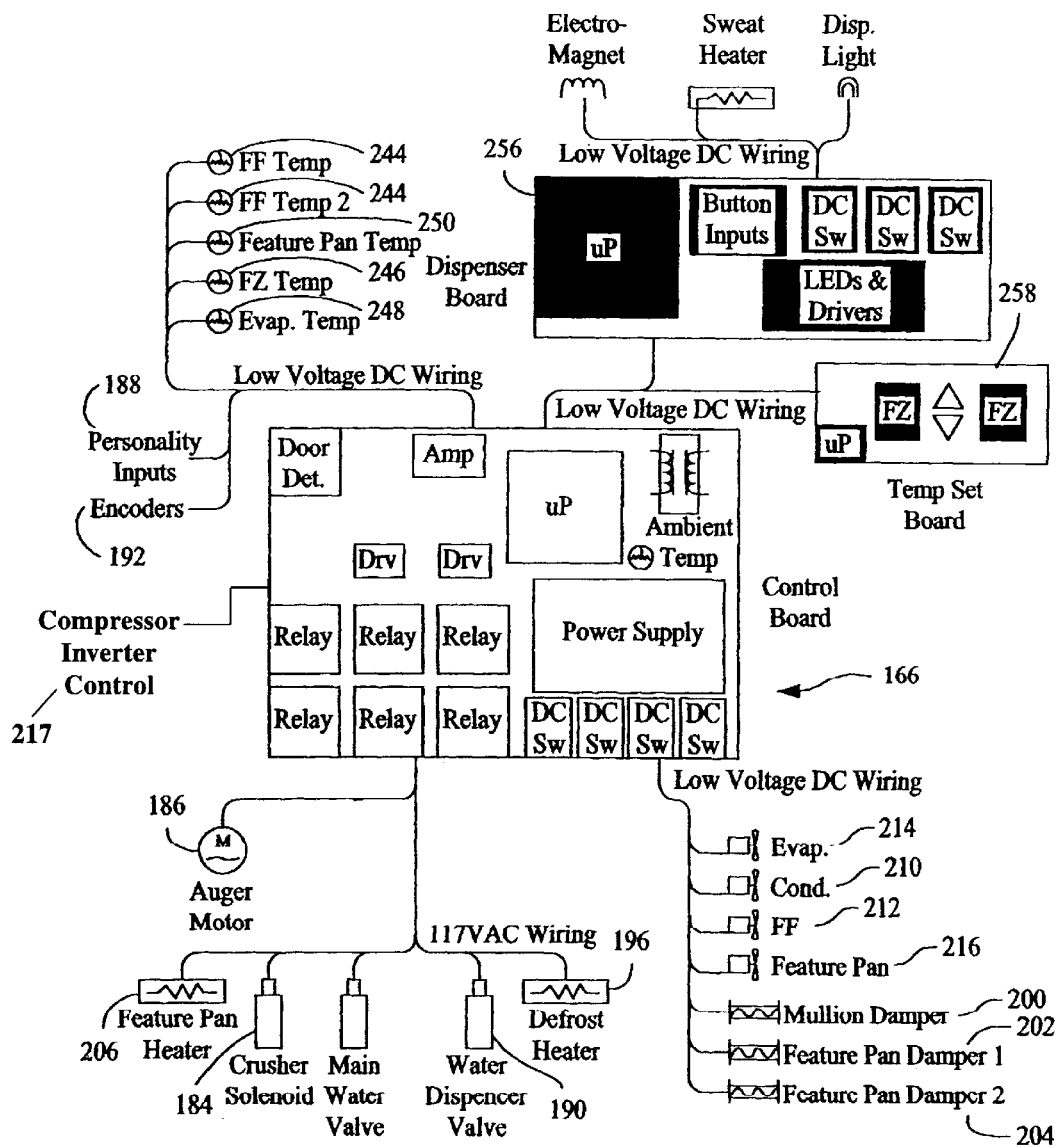
FIG. 4 is a block diagram of the main control board shown in FIG. 2.

FIG. 2 illustrates an exemplary controller 160 in accordance with one embodiment of the present invention. Controller 160 can be used, for example, in refrigerators, freezers and combinations thereof, such as, for example side-by-side refrigerator 100 (shown in FIG. 1).

Controller 160 includes a diagnostic port 162 and a human machine interface (HMI) board 164 coupled to a main control board 166 by an asynchronous interprocessor communications bus 168. An analog to digital converter ("A/D converter") 170 is coupled to main control board 166. A/D converter 170 converts analog signals from a plurality of sensors including one or more fresh food compartment temperature sensors 172, a quick chill/thaw feature pan (i.e., pan 122 shown in FIG. 1 or other temperature controlled compartment) temperature sensors 174, freezer temperature sensors 176, external temperature sensors (not shown in FIG. 2), and evaporator temperature sensors 178 into digital signals for processing by main control board 166.

In an alternative embodiment (not shown), A/D converter 170 digitizes other input functions (not shown), such as a power supply current and voltage, brownout detection, compressor cycle adjustment, analog time and delay inputs (both use based and sensor based) where the analog input is coupled to an auxiliary device (e.g., clock or finger pressure activated switch), sensing of the compressor sealed system components for diagnostics and power/energy optimization. Further input functions include external communication via IR detectors or sound detectors, HMI display dimming based on ambient light, adjustment of the refrigerator to react to food loading and changing the air flow/pressure accordingly to ensure food load cooling or heating as desired, and altitude adjustment to ensure even food load cooling and enhance pull-down rate at various altitudes by changing fan speed and varying air flow.

Digital input and relay outputs correspond to, but are not limited to, a condenser fan speed 180, an evaporator fan speed 182, a crusher solenoid 184, an auger motor 186, personality inputs 188, a water dispenser valve 190, encoders 192 for set points, a defrost heater 196, a door detector 198, a mullion damper 200, feature pan air handler dampers 202, 204, and a quick chill/thaw feature pan heater 206. Main control board 166 also is coupled to a pulse width modulator 208 for controlling the operating speed of a condenser fan 210, a fresh food compartment fan 212, an evaporator fan 214, and a quick chill system feature pan fan 216. Additionally, main control board 166 is coupled to an inverter 217 that is, in turn, coupled to a compressor 219. Inverter 217 is supplied continuously with AC power and used to control compressor 219 at a selected speed in response to a signal from main control board 166, such as square wave of 0–5 V in one embodiment. As such, compressor 219 is operable at a plurality of speeds, as further explained below.

FIGS. 3A–3C and 4 are more detailed block diagrams of main control board 166. As shown in FIGS. 3A–3C and 4, main control board 166 includes a processor 230. Processor 230 performs temperature adjustments/dispenser communication, AC device control, signal conditioning, microprocessor hardware watchdog, and EEPROM read/write functions. In addition, processor 230 executes many control algorithms including sealed system control, evaporator fan control, defrost control, feature pan control, fresh food fan control, stepper motor damper control, water valve control, auger motor control, cube/crush solenoid control, timer control, and self-test operations.

Processor 230 is coupled to a power supply 232 which receives an AC power signal from a line conditioning unit 234. Line conditioning unit 234 filters a line voltage which is, for example, a 90–265 Volts AC, 50/60 Hz signal. Processor 230 also is coupled to an EEPROM 236 and a clock circuit 238.

A door switch input sensor 240 is coupled to fresh food and freezer door switches 242, and senses a door switch state. A signal is supplied from door switch input sensor 240 to processor 230, in digital form, indicative of the door switch state. Fresh food thermistors 244, a freezer thermistor 246, at least one evaporator thermistor 248, a feature pan thermistor 250, and an ambient thermistor 252 are coupled to processor 230 via a sensor signal conditioner 254. Conditioner 254 receives a multiplex control signal from processor 230 and provides analog signals to processor 230 representative of the respective sensed temperatures. Processor 230 also is coupled to a dispenser board 256 and a temperature adjustment board 258 via a serial communications link 260. Conditioner 254 also calibrates the above-described thermistors 244, 246, 248, 250, and 252.

Processor 230 provides control outputs to a DC fan motor control 262, a DC stepper motor control 264, a DC motor control 266, and a relay watchdog 268. Watchdog 268 is coupled to an AC device controller 270 that provides power to AC loads, such as to water valve 190, cube/crush solenoid 184, auger motor 186, a feature pan heater 206, and defrost heater 196. DC fan motor control 266 is coupled to evaporator fan 214, condenser fan 210, fresh food fan 212, and feature pan fan 216. DC stepper motor control 266 is coupled to mullion damper 200, and DC motor control 266 is coupled to one of more sealed system dampers.

Periodically, controller 160 reads fresh food compartment thermistors 244 and freezer thermistor 246 to determine respective temperatures of fresh food compartment 102 (shown in FIG. 1) and freezer compartment 104 (shown in FIG. 1). Based on the determined temperatures of compartments 102, 104, controller 160 makes control algorithm decisions, including selection of operating speed of the various sealed system components, as described below.

Figure 5:
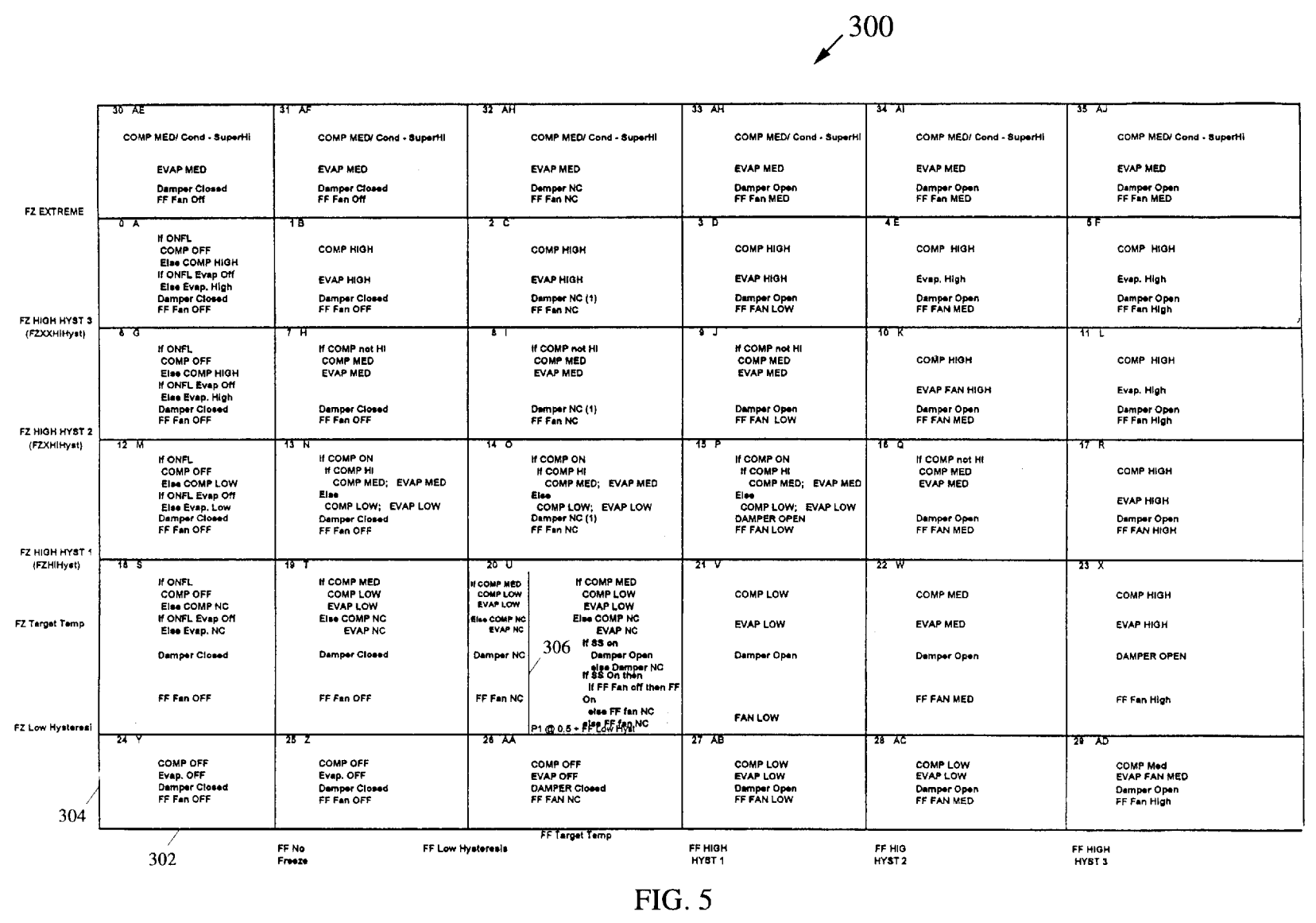

FIG. 5 illustrates an exemplary logic control grid 300 executable by controller 160 (shown in FIG. 4) to automatically configure itself for optimum control, irrespective of the refrigerator platform on which it is installed, such as refrigerator 100 (shown in FIG. 1). Controller 160 also dynamically reconfigures control grid 300 for an optimal platform control algorithm architecture. As used herein, an "optimal algorithm" is one that efficiently drives a refrigerator platform from a given operational state toward a steady state temperature at user-selected set points. As will become apparent below, the steady state temperature is achieved by execution of various "optimal" algorithms dependent upon actual temperature conditions of the refrigerator.

Control grid 300 includes a first axis 302 partitioned into a plurality of operating ranges of fresh food (FF) compartment 102 (shown in FIG. 1) temperatures, and a second axis 304 partitioned into a plurality of operating ranges of freezer (FZ) compartment 104 (shown in FIG. 1) temperature. More specifically, and in increasing order, first axis 302 includes partitions defined by a fresh food compartment minimum allowable temperature (FF No Freeze), a fresh food compartment lower target temperature (FF Low Hysterisis), a fresh food compartment upper target temperature (FF High Hyst 1), a fresh food compartment alarm temperature (FF High Hyst 2, sometimes referred to as FF Extra High Hysterisis), and an extreme fresh food compartment temperature (FF High Hyst 3, sometimes referred to as FF Super High Hysterisis). As may be seen in FIG. 5, a target temperature zone of fresh food compartment 102 is found between fresh food compartment lower target temperature (FF Low Hysterisis) and fresh food compartment upper target temperature (FF High Hyst 1).

Likewise, second axis 304 of control grid 300 includes partitions defined by freezer compartment temperatures. In increasing order, axis 304 partitions include a lower freezer compartment target temperature (FZ Low Hysterisis), a freezer compartment upper target temperature (FZ High Hyst 1), an upper hysteresis freezer compartment temperature (FZ High Hyst 2, sometimes referred to as FZ Extra High Hysterisis), a freezer alarm temperature (FZ High Hyst 3, sometimes referred to as FZ Super High Hysterisis) and an extreme freezer high temperature limit (FZ Extreme). As may be seen in FIG. 5, a target temperature zone of freezer compartment 104 is found between lower freezer compartment target temperature (FZ Low Hysterisis), a freezer compartment upper target temperature (FZ High Hyst 1).

Actual temperatures that define the above-described partitions of first axis 302 and second axis 304 are refrigerator specific and dependant on refrigeration compartment setpoints.

In combination, the partitions of the first and second axes 302, 304 define a plurality of "states" of the refrigerator, and each operating point of refrigerator 100, as determined by respective temperatures of fresh food and freezer compartments 102, 104, is contained in one of the states of control grid 300. In the illustrated embodiment, control grid includes thirty six states labeled "0" through "35." It is contemplated, however, that greater or fewer states could be employed in alternative embodiments.

State "20" represents the desired steady state temperature of refrigerator 100 (shown in FIG. 1) established by user-selected set points of fresh food compartment temperature and freezer compartment temperature. Each state of control grid 300 contains an optimal algorithm (settings or rules) to adjust control parameters accordingly to drive the state of refrigerator 100 to state "20" and maintain an operational condition in state "20." Specifically, each control grid state includes a compressor parameter, an evaporator fan speed parameter, a mullion damper parameter, and a fresh food fan parameter.

The compressor/condenser parameter is set to activate compressor 219 and condenser fan 210 (shown in FIGS. 3A–3C) through compressor inverter control 217 (shown in FIGS. 24) and condenser fan speed control 180, respectively, to one of a plurality of operating modes. More specifically, in an exemplary embodiment, the compressor/condenser parameter may be one of COMP ON (activate compressor and condenser), COMP LOW, (low speed), COMP MED (medium speed), COMP HIGH (high speed) COUP OFF (deactivate compressor) and COMP NC (no change). Generally speaking, compressor 219 and condenser fan 210 are off at lower FF and FZ temperatures of respective control grid axes 302, 304, a compressor 219 and condenser fan 210 are activated as FF and FZ temperatures rise, and operating speeds of compressor 219 and condenser fan 210 are increased as compartment temperatures rise further. Thus, the warner the compartments are the more compressor 219 and condenser fan 210 are utilized, while the cooler the compartments are the less compressor 219 and condenser fan 210 are utilized. Except where indicated in grid 300, compressor 219 and condenser fan 210 are operated at a complementary speed (i.e., high, medium or low) in grid 300 through the compressor/condenser parameter. In other words, except where indicated when the compressor speed is "high" the condenser fan speed is "high," when the compressor speed is "medium" the condenser fan speed is "medium" and when the compressor speed is "low" the condenser fan speed is "low." The speeds of the compressor and condenser fan are complementary in a relative sense. It is contemplated that actual revolutions per minute of the compressor and condenser fan in a given speed (high, medium, and low) may differ from one another, and it is contemplated that the compressor fan and the condenser fan in further embodiments may be independently controlled (i.e., not at complementary speeds).

In one embodiment, the different speeds (e.g., high, medium, or low) of compressor 219 are accomplished with a compressor coupled to inverter 217 (shown in FIG. 2) for driving compressor 219 at a designated speed. In an alternative embodiment, a known variable capacity compressor may be employed to produce effects similar to a variable speed compressor. Additionally, it is contemplated that more than three compressor speeds (e.g., high, medium or low) may be employed in further embodiments without departing from the scope of the present invention.

The evaporator fan speed parameter in an exemplary embodiment may be one of EVAP OFF (evaporator fan deactivated), EVAP LOW (low speed), EVAP MED (medium speed), EVAP HIGH (high speed) and EVAP NC (no change). Controller 160 operates evaporator fan 214 (shown in FIGS. 2–4) according to the appropriate evaporator fan speed parameter for a given state in control grid 300. It is contemplated that more than three evaporator fan speeds (e.g., high, medium or low) may be employed in further embodiments without departing from the scope of the present invention.

The mullion damper parameter is set to actuate mullion damper 200 (shown in FIGS. 2–4) to a closed position ("Damper Closed"), an open position ("Damper Open") or no change ("Damper NC").

Fresh food fan parameter is set to operate fresh food fan 212 (shown in FIGS. 2–4) to off ("FF Fan Off"), low speed ("FF Fan Low"), medium speed ("FF Fan High"), high speed ("FF Fan High") and no change ("FF Fan NC"). It is contemplated that more than three fresh food fan speeds (e.g., high, medium or low) may be employed in further embodiments without departing from the scope of the present invention.

Another parameter of interest in the exemplary embodiment is ONFL (obey no freeze limit) which is a configuration byte for control grid 300 that controller 162 either recognizes or does not recognize, particularly when FF temperature on axis 302 is below FF No Freeze.

In alternative embodiments, other control parameters are used to accommodate specific sealed systems, other or additional fan speeds, and other damper positions. For example, the compressor, condenser fan, evaporator fan, and fresh food fan can each be operated at a practically infinite number of speeds (dependant upon one another or independent of one another in different embodiments), and the mullion damper can be positioned at a practically infinite number of positions between the open and closed positions to produce further system behavior gradations with a finer resolution (i.e., an increased number of states in control grid 300).

As an illustrative example of operation of control grid 300, the applicable state is determined by reading fresh food thermistor 244 and freezer thermistor 246, and suppose that the thermistor readings indicate that state "4" is the applicable state, (i.e., the fresh food compartment 102 temperature is between FF HIGH HYST 2 and FF HIGH HYST 3, and freezer temperature is between FZ HIGH HYST 3 and FZ EXTREME). Once the state is determined, controller 160 (shown in FIGS. 2–4) adjusts values of the control parameters according to the settings in state Accordingly, once in state "4," the compressor parameter, the evaporator fan parameter, the mullion damper parameter and the fresh food fan parameter for state "4" are read in as data by controller 160. The operating parameters for the respective components are then adjusted according to the read parameters for state "4", if necessary, to correspond to the "optimal" settings contained in state "4." Specifically, and referring to FIG. 5, in state "4" the compressor parameter is set to COMP HIGH so that the compressor is operated at high speed. The evaporator fan parameter is set to high. The mullion damper parameter is set open, and fresh food fan parameter is set to medium. The adjusted settings of state "4" will drive refrigerator 100 to an adjacent state in control grid 300, such as state "3."

Once in state "3," control parameters are again read by controller 160 and adjusted according to the optimal settings in state "3." Once the settings are adjusted in state "3," refrigerator 100 is driven to another state adjacent to state "3." Thus, refrigerator 100 floats from state to state in control grid 160 as refrigerator 100 is used and temperature conditions and operating environments change, and each state is configured to drive refrigerator toward a steady state at state "20" wherein both refrigeration compartment 102 and freezer compartment 104 are maintained at target temperatures.

As may be seen in FIG. 5, state "20" is further partitioned according to fresh food compartment temperature along control grid axis 302, and each sub-partition includes an optimal algorithm (settings or rules) for the respective sub-areas of the partition. As such, the behavior of controller 160 may be somewhat different in state "20" depending on how state "20" is reached or more specifically whether the refrigeration compartments are warming or cooling.

More specifically, assume, for example that the mullion damper is closed in state "19" and consequently that the fresh food compartment temperature increases while freezer compartment temperature remains substantially constant. Eventually, the temperature increase in the fresh food compartment drives refrigerator 100 from state "19" to state "20" through the left hand side of state "20." As such, the left hand algorithm in state "20" is read by controller 160 and the data parameters are set accordingly. Thus, if the compressor parameter was set at COMP MED when state "20" was entered, the compressor parameter is changed to COMP LOW, and the evaporator fan speed parameter is changed to EVAP LOW. If the compressor speed parameter was not set at COMP MED when state "20" was entered, the compressor parameter is not changed (COMP NC) and the evaporator fan speed parameter is not changed (EVAP NC). Further, the mullion damper parameter is not changed and the fresh food fan parameter is not changed.

As the mullion damper remains closed according to the left-hand algorithm of state "20," fresh food compartment temperature continues to rise and eventually crosses over a partition 306 in state "20" and the right-hand algorithm of state 20 is employed. As such, the right hand algorithm in state "20" is read by controller 160 and the data parameters are set accordingly. Thus, because the compressor parameter was set at COMP LOW by the left-hand algorithm of state "20" the compressor parameter according to the right hand algorithm is COMP NC and the compressor state is unchanged and the evaporator fan speed parameter is set to EVAP LOW. Further, as the sealed system (SS) is on, the mullion damper is opened according to the right hand algorithm to counteract the rising fresh food compartment temperature along axis 302. Additionally, the fresh food fan was off in state "19" and also off in the left-hand algorithm of state "20," so the fresh food fan parameter is set to on (FF Fan On) at low speed according to the right hand algorithm at state "20." Rising fresh food compartment temperature is therefore counteracted by opening the mullion damper and turning on the fresh food compartment fan to introduce cool air into the refrigeration compartment.

Note, however, that if fresh food compartment temperature begins to fall from the right hand-algorithm of state "20" back to the left hand algorithm that none of the control parameters are changed. As such, at least in state "20" the behavior of the system is dependent upon whether fresh food temperatures are rising or falling. It is contemplated that other states in control grid 300 may employ similar sub-partitions along either of axes 302, 304 to produce further gradations in control of the refrigeration system.

In another aspect, data parameters may be changed around the edges of control grid 300 to change the behavior of controller 160. For example, if FF HIGH HYST 2 is set equal to FF HIGH HYST 1 on first axis 302, the column containing state "3," state "9," state "15," and state "21," state "27," and state "33" effectively disappears so that control grid 300 contains thirty effective states rather than the illustrated thirty six. Likewise FF No Freeze on first axis 302 could be set to −20° F. in the data stream, effectively eliminating state "0," state "6," state "12," and state "18," state "24," and state "30" from control grid 300. As such control grid 300 can be dynamically reconfigured to have varying numbers of states.

Figure 6:
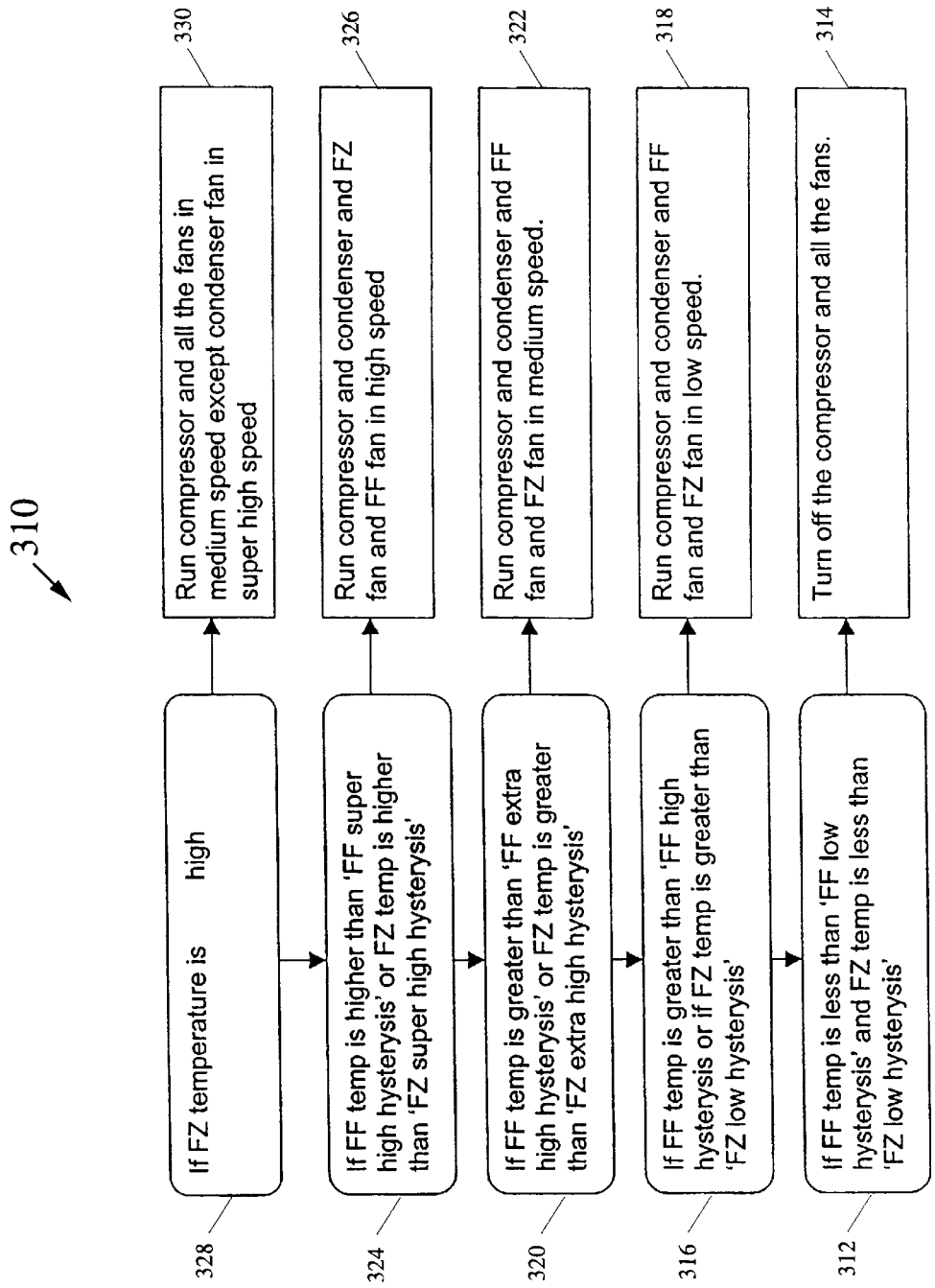
FIG. 6 is a condensed flow chart of the control grid shown in FIG. 5.

FIG. 6 is a condensed flow chart 310 of control grid 300 (shown in FIG. 5) illustrating the general principles of the state algorithms therein. Generally, and as indicated in state 312, if fresh food compartment temperature along axis 302 (shown in FIG. 5) is less than FF Low Hysterisis and if freezer compartment temperature along axis 304 (shown in FIG. 5) is less than FZ Low Hysterisis, the compartments are c sufficiently cool. Controller 160 accordingly turns off or leaves off 314 the sealed system (i.e., deactivates the compressor and all the fans) to avoid further cooling of the refrigeration compartments.

If, as indicated in state 316, fresh food compartment temperature along axis 302 (shown in FIG. 5) is greater than FF Low Hysterisis and if freezer compartment temperature along axis 304 (shown in FIG. 5) is greater than FZ HIGH HYST 1, the compartments are slightly warmer than desired. Controller 160 accordingly turns on 318 the compressor, condenser fan, evaporator fan and the fresh food fan at low speed to slightly cool the refrigeration compartments.

If, as indicated in state 320, fresh food compartment temperature along axis 302 (shown in FIG. 5) is greater than FF HIGH HYST 2 and if freezer compartment temperature along axis 304 (shown in FIG. 5) is greater than FZ HIGH HYST 2, the compartments are much warmer than desired. Controller 160 accordingly turns on 322 the compressor, condenser fan, evaporator fan and the fresh food fan in medium speed to moderately cool the refrigeration compartments.

If, as indicated in state 324, fresh food compartment temperature along axis 302 (shown in FIG. 5) is greater than FF HIGH HYST 3 and if freezer compartment temperature along axis 304 (shown in FIG. 5) is greater than FZ HIGH HYST 3, the compartments are very much warmer than desired. Controller 160 accordingly turns on 326 the compressor, condenser fan, the evaporator fan and the fresh food fan in high speed to greatly cool the refrigeration compartments.

If, as indicated in state 328, freezer compartment temperature along axis 304 (shown in FIG. 5) is greater than FZ Extreme, compressor 219, the fresh food fan, and the evaporator fan, are operated 330 in medium speed while the condenser fan 210 is operated at a speed greater than the high speed (e.g., super high speed) to pull down evaporator temperature and lower the temperature of the refrigeration compartments in an energy efficient manner while recognizing and avoiding power limitations of inverter 217

(shown in FIG. 2) that controls compressor 219. By running compressor 219 and condenser fan 210 in medium speed, inverter 217 is prevented from exceeding a maximum power limit that is likely to be incurred in extremely warm temperature conditions of the refrigeration compartments (e.g., freezer compartment temperature greater than FZ Extreme) if compressor 219 is run at high speed in an effort to pull temperatures down quickly. Avoiding potential inverter overload conditions in this manner allows higher charge refrigerant to be employed for greater energy efficiency in desired set point temperature ranges per applicable regulations. This is achieved despite a tendency of the higher charge refrigerant to increase system pressure when pulling down the evaporator temperature because overload protection interruption of inverter 217 is avoided that would shut down compressor 219.

It should be apparent from FIGS. 5 and 6 that the refrigeration system is configured to run substantially full time so long as compartment temperatures exceed minimum threshold values, and subject to defrosting operations wherein the sealed system is shut down. Because the system is capable of changing capacity by changing compressor speed and condenser fan speed, the system more capably responds to cooling needs due to changing operating conditions and environments, such as door open events, food loading and ambient temperature fluctuation. Consequently, less temperature variation over time in the refrigeration compartments is incurred. In addition, as the system runs at low speed when refrigeration compartment temperatures are at or near user setpoints, noise is noticeably reduced in normal operation of the refrigerator and energy efficiency is maintained.

Figure 7:
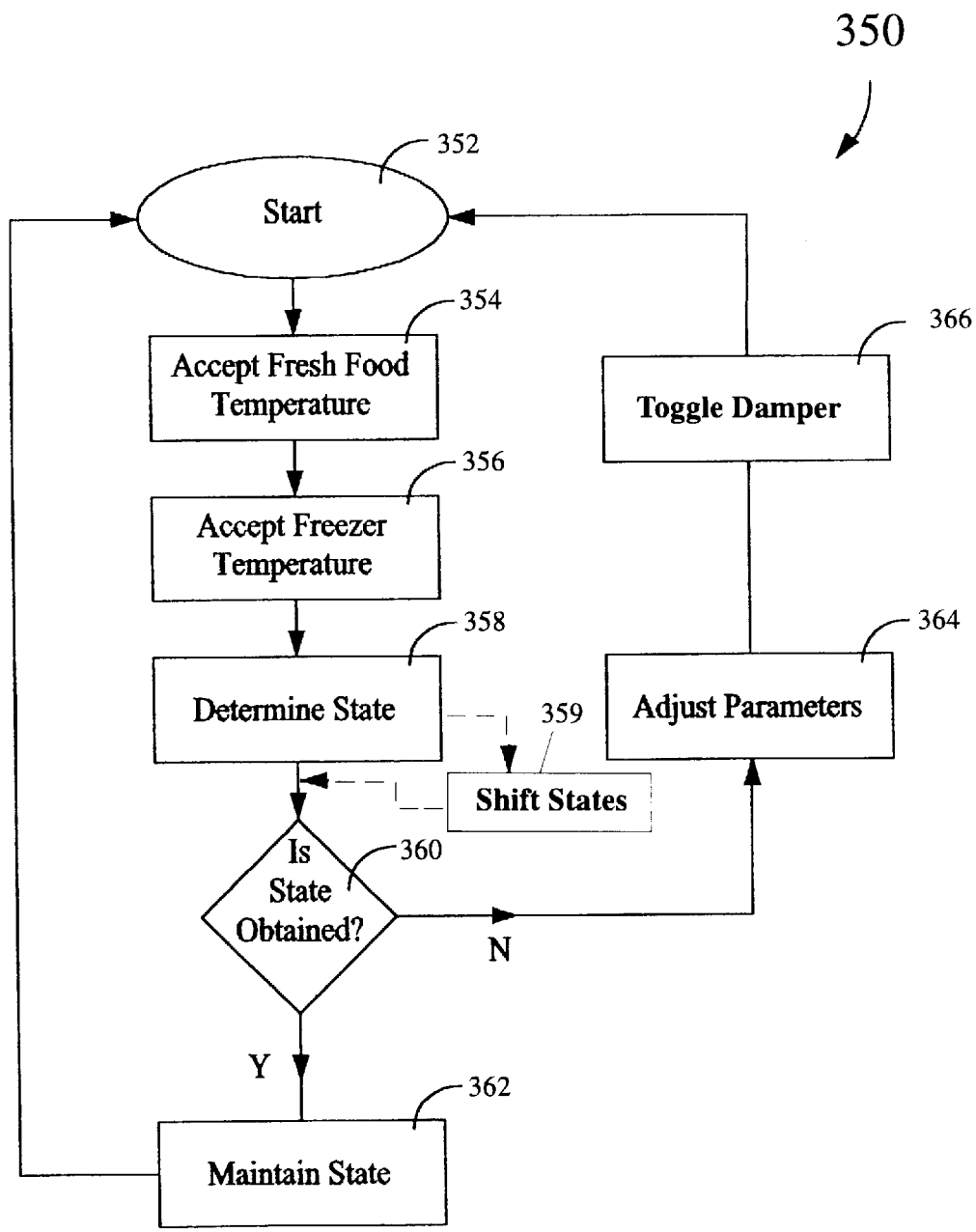
FIG. 7 is an energy performance and temperature performance flow chart.

FIG. 7 illustrates a control algorithm 350 for controlling energy performance and temperature performance of a refrigeration system using control grid 300 (shown in FIG. 5). Control algorithm begins 352 by reading 354 a fresh food compartment temperature with thermistors 244 (shown in FIGS. 3 and 4) and also reading 326 freezer compartment temperature using freezer thermistor 246 (shown in FIGS. 3 and 4). Using logic control grid 300, a current state of the refrigerator is determined 358.

In a further embodiment, states of control grid 300 may be shifted 359 (shown in phantom in FIG. 9) in order to accommodate better cooling performance. States of control grid 300 may be shifted negatively (leftward or downward as illustrated in FIG. 5) or positively (rightward or upward as illustrated in FIG. 5) to improve cooling performance. Depending on the determined state in control grid 300, control grid states are shifted positively or negatively by adjusting the partitions on grid axes 302 and 304 according to an exemplary scheme set forth below.

A refrigerator state is determined 358 on a periodic basis, such as, for example, every 15 minutes. A grid shift value is then determined according to the following relationships based upon the state of the refrigerator. One or both of axes 302, 204 may be shifted according to the sensed temperature of the respective compartments.

If the determined refrigeration compartment temperature is greater than an actual set point value (selected by a user) plus a first predetermined amount, such as 1° F., then grid 300 is shifted negatively by a first pre-selected amount, such as 0.1° F. In other words, the partitions corresponding to the determined compartment temperature that define the control grid states are shifted leftward (for axis 302) or downward (for axis 304) by a pre-selected amount of 0.1° F. Negative shifting of the grid by the first pre-selected amount when refrigeration compartment temperature exceeds the actual set point value plus the first predetermined amount results in higher sealed system speeds for a longer period of time to cool the refrigeration compartment faster than if no shift incurred.

If the determined refrigeration compartment temperature is greater than an actual set point value (selected by a user) plus a second predetermined amount less than the first predetermined amount, such as 0.2° F., then grid 300 is shifted negatively by a second pre-selected amount less than the first pre-selected amount, such as 0.02° F. In other words, the partitions corresponding to the determined compartment temperature that define the control grid states are shifted leftward (for axis 302) or downward (for axis 304) by the second pre-selected amount of 0.02° F. Negative shifting of the grid by the second pre-selected amount when refrigeration compartment temperature exceeds the actual set point value plus the second predetermined amount results in higher sealed system speeds for a longer period of time to cool the refrigeration compartment faster than if no shift incurred. Because the second predetermined amount is much smaller than the first predetermined amount, the negative shift decreases proportionately as the determined state approaches the set value.

If the determined refrigeration compartment temperature is less than an actual set point value (selected by a user) minus a first predetermined amount, such as 10° F., then grid 300 is shifted positively by a first pre-selected amount, such as 0.1° F. In other words, the partitions corresponding to the determined compartment temperature that define the control grid states are shifted rightward (for axis 302) or upward (for axis 304) by the first pre-selected amount of 0.1° F. Positive shifting of the grid by the first pre-selected amount when refrigeration compartment temperature is below the actual set point value minus the first predetermined amount counteracts negative shift and moves the control grid closer to a centered position about the actual set point value.

If the determined refrigeration compartment temperature is less than an actual set point value (selected by a user) minus a second predetermined amount, such as 0.2° F., then grid 300 is shifted positively by a second pre-selected amount, such as 0.02° F. In other words, the partitions corresponding to the determined compartment temperature that define the control grid states are shifted rightward (for axis 302) or upward (for axis 304) by the second pre-selected amount of 0.1° F. Positive shifting of the grid by the first pre-selected amount when refrigeration compartment temperature is below the actual set point value minus the first predetermined amount counteracts negative shift and moves the control grid closer to a centered position about the actual set point value at a reduce rate as the determined state approaches the actual set point value.

In an exemplary embodiment, the control grid states are not shifted beyond predetermined thresholds on each of the control grid axes 302, 304. For example, in one embodiment, shifting occurs only if the determined state 358 is within a range of the actual set point value plus or minus an extra high hystersis setoff. In other words, in a particular embodiment, shifting occurs only in designated temperature ranges above and below the actual set point value. If the determined state 358 is outside the designated temperature ranges, no shifting 359 of the grid occurs.

It is recognized that other shift values and relationships may be employed in alternative embodiments without departing from the scope of the present claims. The specific shift values and relationships described above are for illustrative purposes only.

Once the current state is determined 358 and when applicable grid 300 is shifted 359, controller 160 checks 360 to see if the desired state has been obtained, i.e., whether actual control parameter settings correspond to the settings for the determined state in control grid 300. If the desired state has been obtained, then the current control parameters are maintained 362. However, if the desired state has not been obtained, control parameters are adjusted 364 to the settings of the determined state. The refrigerator system is then run at the appropriate settings until controller 160 restarts 352 algorithm 350 and reads 354, 356 refrigeration compartment temperatures. Reading 354, 356 of thermistors occurs on a periodic basis and control parameters are adjusted 364 accordingly to maintain control of refrigerator 100.

Additionally, in an further embodiment, mullion damper 200 is toggled 366 on a periodic basis to prevent frost buildup that may impair movement of mullion damper 200 or prevent proper operation thereof. That is, when the damper is in a closed position it is toggled to an opened position and returned to the closed position, and when the damper is in an opened position it is toggled to the closed position and returned to the open position. In an exemplary embodiment, damper 200 is toggled 366 at thirty minute intervals. In alternative embodiments, however, damper 200 may toggled 366 more regularly or less regularly. Additionally, toggling may occur the same or different time that compartment temperatures are read 354, 356 or control parameters are adjusted 364.

Algorithm 350 fundamentally requires data input to operate in an appropriate manner. In one embodiment, the data input can be from permanent memory, such as Read-Only Memory (ROM) or Programmable Read-Only Memory (PROM). The data values are determined before the manufacturer of the control system. In an alternative embodiment, the data is stored in non-volatile reprogrammable memory, such as Electrically Erasable Programmable Read-Only Memory (EEPROM) 236 (shown in FIGS. 3A–3C) or battery backed up Random Access Memory (RAM) so that data values may be determined late in the manufacturing process, and so that data values may be updated in the field.

In one embodiment, access to the data is via Dual In-Line Package (DIP) switches. At manufacture time or service time, the installer sets the DIP switches to match the type of refrigerator in which the control is installed. Alternatively, wires in a refrigerator wiring harness are used to select the board's "personality". The appropriate algorithm and data are automatically selected by the control based on the personality of the refrigerator in which it was installed.

While the invention has been described in terms of various specific embodiments, those skilled in the art will recognize that the invention can be practiced with modification within the spirit and scope of the claims.

What is claimed is:

1. A method for controlling a sealed system for forcing cold air through a first and a second compartment, the sealed system including a variable speed compressor, a condenser fan, an evaporator fan and a second compartment fan, the sealed system further including a controller operatively coupled to the variable speed compressor, the condenser fan, the evaporator fan and the second fan, said method comprising:

establishing a control grid having at least one axis corresponding to a temperature at the first compartment, the axis divided into a plurality of operating states of the sealed system, each of the states corresponding to a sensed temperature condition at the first compartment, and each of the states including a designated compressor speed parameter, the compressor speed parameter in some of the states different from the compressor speed parameter in other of the states;

operating each of the compressor and the condenser fan in a first complementary speed in at least a first one of the states;

operating each of the compressor and the condenser fan in a second speed complementary in at least a second one of the states, the second speed less than the first speed; and operating each of the compressor and condenser fan in a third speed in at least a third one of the states in the control grid, the third speed in between the first speed and the second speed, wherein operating each of the compressor and condenser fan at disparate speeds in at least a second one of the states of the control grid comprises operating the condenser fan in the third speed and operating the condenser fan at a fourth speed, the fourth speed greater than the first speed.

2. A method for controlling a sealed system in accordance with claim 1 further comprising:

sensing a temperature condition at the second compartment; and operating the compressor according to the compressor speed parameter of the state corresponding to the sensed condition of the second compartment.

3. A method in accordance with claim 1, the sealed system further including a condenser fan, said method further comprising shifting the states of the control grid in response to the sensed condition.

4. A method for controlling a scaled system including a controller operatively coupled to a compressor operable at a multiplicity of speeds, a condenser fan operable at a multiplicity of speeds, and an evaporator fan operable at a multiplicity of speeds, said method comprising:

coupling the controller to at least a first thermistor in a first location;

coupling the controller to at least a second thermistor in a second location, when the first and second location are in flow communication via damper therebetween;

sensing a temperature at the first location with the at least one thermistor;

selecting optimum control parameters for the compressor, condenser fan and evaporator fan from one of a plurality of state corresponding to the sensed temperature in a control grid; and operating the compressor, condenser fan, and evaporator fan according to the control parameters.

5. A method in accordance with claim 4 further comprising:

sensing a temperature at the second location; and selecting control parameters from one of the plurality of states corresponding to a sensed temperature from the first location and also corresponding to a sensed temperature from the second location.

6. A method in accordance with claim 5 wherein the sealed system is a refrigerator sealed system, the refrigerator including a first refrigeration compartment and a second refrigeration compartment, said sensing a temperature comprising at the first location comprising sensing a temperature of the first compartment and said sensing a temperature at the second location comprising sensing a temperature of the second compartment.

7. A method for controlling a refrigeration system, the refrigeration system including a fresh food compartment and a freezer compartment with a damper establishing flow communication therebetween, a sealed system for forcing cold air through the refrigerator compartments, the sealed system including a compressor, a condenser fan, an evaporator fan and a fresh food compartment fan, the refrigerator further including a controller operatively coupled to the compressor, the condenser fan, the damper, the evaporator fan and the fresh food fan, said method comprising the steps of:

reading data corresponding to a fresh food compartment condition;

reading data corresponding to a freezer compartment condition;

determining a state of the refrigeration system in a two-dimensional logic control grid based upon the fresh food compartment and the freezer compartment data; and executing an optimal control algorithm for the determined state of the refrigeration system, the optimal control algorithm including one of a plurality of compressor speeds corresponding to the determined state.

8. A method in accordance with claim 7 further comprising the step of configuring the two-dimensional logic grid to contain a selected number of states.

9. A method in accordance with claim 7 wherein the grid comprises a first axis and a second axis, said step of configuring the two-dimensional logic grid comprises the step of partitioning the first and second axes of the grids, the partitions defining the control grid states.

10. A method in accordance with claim 7 wherein said step of executing the optimal control algorithm comprises the steps of:

comparing speed values of the compressor, the condenser fan, the evaporator fan, the fresh food fan with desired values determined by the located control grid state; and adjusting speed values of the compressor, the condenser fan, the evaporator fan, the fresh food fan to the desired values if the set values are different than the desired values.

11. A method in accordance with claim 7 further comprising shifting the control grid based upon the determined state.

12. A method in accordance with claim 11 further comprising toggling the damper on a periodic basis.

13. A control system for a refrigeration system, the refrigeration system including a fresh food compartment and a freezer compartment with a damper establishing flow communication therebetween, a sealed system for forcing cold air through the refrigerator compartments, the sealed system including a compressor, a condenser, an evaporator fan and a fresh food compartment fan, said control system comprising:

a controller operatively coupled to the damper, the compressor, the condenser fan, the evaporator fan and the fresh food fan, said controller configured to:

determine an applicable state of the refrigeration system in a two-dimensional logic control grid;

execute an optimal control algorithm for the determined state of the refrigeration system; and adjust control parameters as the determined state changes over time, at least one of the parameters corresponding to a compressor speed.

14. A control system in accordance with claim 13 wherein said control parameters further comprise an evaporator fan parameter, a fresh food fan parameter, and a damper parameter.

15. A control system in accordance with claim 13 wherein said control grid comprises a first axis and a second axis, said first axis corresponding to a fresh food compartment temperature, and said second axis corresponding to a freezer compartment temperature.

16. A control system in accordance with claim 15, said control grid partitioned into a plurality of states and comprising an optimal control algorithm corresponding to each of said states, at least one of said states sub-partitioned into a first sub-state and a second sub-state, each of said first and second sub-states including an optimal control algorithm for each of said first and second sub-state.

17. A refrigerator comprising a cabinet;

a first refrigeration compartment within said cabinet;

a second refrigeration compartment within said cabinet;

a damper establishing flow communication between said first and second refrigeration compartment;

a sealed system for forcing cold air through said first and second refrigerator compartments, said sealed system comprising a compressor, a condenser fan, an evaporator fan and a fresh food compartment fan;

a controller operatively coupled to said damper, said compressor, said condenser fan, said evaporator fan and said fresh food fan, said controller configured to:

determine an applicable state of the refrigeration system in a two-dimensional logic control grid corresponding to temperature conditions of said first refrigeration compartment and said second refrigeration compartment; and adjust control parameters for said sealed system as said determined state changes over time, at least one of the parameters corresponding to a compressor speed value.

18. A refrigerator in accordance with claim 17, said controller further configured to shift said grid based upon temperature conditions of said first refrigeration compartment and said second refrigeration compartment.

* * * * *

UNITED STATES PATENT AND TRADEMARK OFFICE
CERTIFICATE OF CORRECTION

PATENT NO. : 6,779,353 B2 Page 1 of 1
DATED : August 24, 2004
INVENTOR(S) : Hu et al.

It is certified that error appears in the above-identified patent and that said Letters Patent is hereby corrected as shown below:

Column 14,
Line 34, after "controlling a" delete "scaled" and insert -- sealed --.
Line 42, after "location," delete "when" and insert -- wherein --.
Line 49, delete "state" and insert -- states --.

Signed and Sealed this

Twenty-third Day of May, 2006

JON W. DUDAS
*Director of the United States Patent and Trademark Office*